United States Patent [19]

Weidler et al.

[11] 4,306,605
[45] Dec. 22, 1981

[54] CONNECTOR FOR CHAINS

[76] Inventors: Erhard A. Weidler, Danziger Str. 32, 7080 Aalen, Fed. Rep. of Germany, 7080; Manfred Styrnol, Kapellenweg 20, Oberkochen, Fed. Rep. of Germany, 7082

[21] Appl. No.: 114,645

[22] Filed: Jan. 23, 1980

[30] Foreign Application Priority Data

Feb. 1, 1979 [DE] Fed. Rep. of Germany ....... 2904000

[51] Int. Cl.³ .............................................. B60C 27/00
[52] U.S. Cl. .................................... 152/241; 24/316; 24/369; 152/243
[58] Field of Search ............... 152/241, 243, 244, 239; 59/86, 93; 24/73 AC, 73 CE, 73 HH, 73 HR, 155 R, 155 CC, 316, 320, 326, 369

[56] References Cited

U.S. PATENT DOCUMENTS 3,835,908 9/1974 Rieger et al. ....................... 152/243
4,020,885 5/1977 Sato ................................ 152/243 X
4,147,023 4/1979 Weidler ................................ 59/86

FOREIGN PATENT DOCUMENTS 765176 1/1953 Fed. Rep. of Germany.
1605670 3/1970 Fed. Rep. of Germany.
409666 10/1966 Switzerland ........................ 152/241

Primary Examiner—William A. Powell
Assistant Examiner—Thomas Bokan
Attorney, Agent, or Firm—Parmelee, Johnson, Bollinger & Bramblett

[57] ABSTRACT

A connector for chains, particularly tire chains, comprises a substantially C-shaped main body (1) whose free arms (3,4) define an insertion gap (5). In a position lying opposite the insertion gap (5) the yoke portion (2) of the main body (1) has roof shaped surfaces (11,12) the apex line of which is intersected by the axis of a stepped bore (6) for receiving a retaining pin (7,14,19) and extends at a right angle to the place of the arms (3,4) and the yoke portion (2). The retaining pin (7,14,19) has an annular flange (8) and is held in its retaining position by means of at least one securing element (10) which is seated in a bore (9,17,18) intersecting the stepped bore (6).

7 Claims, 5 Drawing Figures

CONNECTOR FOR CHAINS

BACKGROUND OF THE INVENTION

The invention relates to a connector for chains, particularly for tire chains, comprising a substantially C-shaped main body whose free arms define an insertion gap permitting the introduction of chain links and whose yoke portion is provided in a position lying opposite the insertion gap with a stepped bore for receiving a retaining pin which has an annular flange and which in its retaining position prevents accidental detachment of chain links.

In one known connector of this kind (DE-PS No. 765 176), which is intended for tire chains, the retaining pin is provided with an annular flange at each end. The ring flanges form stops preventing the retaining pin, which is mounted in the stepped bore with play, from falling out. In the retaining position one of the annular flanges is situated near the insertion gap, while the other is contained in the stepped bore. In order to hold the retaining pin in the retaining position, the yoke portion and the end face of the annular flange contained in the stepped bore must lie against the tread of the tire. In practice this cannot be achieved, because on the one hand tire chains are not held continuously taut during use, and on the other hand the tread has interruptions resulting from the profile of the tire. The consequence is that the retaining pin may move out of the retaining position and that accidental detachment of the chain links held in the connector cannot be prevented with the necessary certainty. Another disadvantage of the known connector consists in that its yoke part, which has a far greater wearing volume than the webs, faces the tire and not the roadway, which is of course the primary source of wear.

A connector for tire chains which has a yoke part directed towards the roadway or ground is also known (DE-PS No. 1 605 670). In this connector the retaining pin is not received in a stepped bore, but in a plain bore, into which the retaining pin is pressed. If in this second connector it is desired for reasons of strength to use a solid retaining pin, very accurate and consequently cost-intensive machining of the bore is required in order to ensure the necessary press fit. In order to keep the cost of machining low, in practice therefore the expedient has been adopted of using resilient retaining pins; these however have a comparatively small cross-section and under the influence of the external forces acting on them, such as for example impact loads from attached chain links, tend to bend or even to break. Moreover, in both cases, that is to say when either solid or non-solid retaining pins are used, limits are imposed on the forces that can be applied in the fitting of the retaining pins. It is therefore impossible to exclude the possibility that under unfavourable conditions the portion of a retaining pin which projects from the yoke part will be subjected to the action of external forces which exceed the fitting forces and consequently result in the displacement of the retaining pin to a position in which it can no longer fulfil its securing function. This danger increases with increasing wear of the yoke part, since this wear automatically leads to a reduction of the length of the press fit, and thus to a decreased holding force.

The problem underlying the invention is that of providing a connector of the kind first described above, in the production of which high standards of accuracy do not have to be met and which nevertheless in use prevents accidental displacements of the retaining pin throughout the entire life of the chain, even under the most unfavourable conditions.

SUMMARY OF THE INVENTION

According to the invention the above problem is solved in that the surfaces of the yoke portion which face the insertion gap are roof-shaped, while the apex line of the roof surfaces is intersected by the axis of the stepped bore and extends at right angles to the arms, and that for the purpose of locking the retaining pin in the retaining position use is made of at least one securing element which is seated in a transverse bore intersecting the stepped bore below the annular flange.

In the region of the retaining pin the main body of the connector according to the invention has a large volume, which not only ensures a long working life but also enables the securing element to be disposed in a position which is not reached by the wear occurring in the course of the normal life of the chain. By splitting the functions of retaining and securing between two components it is possible to use a strong, solid retaining bolt and a weaker resilient securing element. The standard of accuracy to be complied with in the machining of the main body is low. Since the securing element, unlike the retaining pin, does not project into the interior of the main body, but is mounted therein in a protected position, there is no danger that during the use of the chain it will be deformed or displaced by uncontrolled external forces.

Further features and details of the invention will energe from the sub-claims and from the accompanying drawings, which illustrate two examples of embodiment.

DETAILED DESCRIPTION OF THE INVENTION

Figure 1:
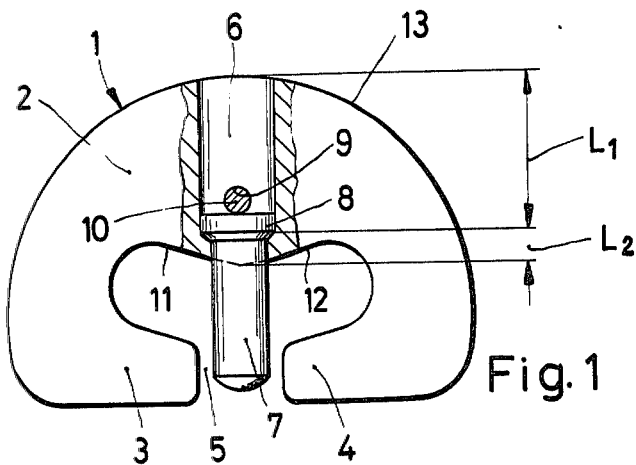
FIG. 1 shows, partly in section, a side view of a first connector.

In FIG. 1, the substantially C-shaped main body of a connector is given the general reference 1. This main body has a yoke portion 2 with arms 3 and 4 adjoining it and defining an insertion gap 5. On the opposite side to the insertion gap the main body 1 is provided with a stepped bore 6. A retaining pin 7 having an annular flange 8 is seated in the stepped bore 6. Above the annular flange 8 the stepped bore 6 is intersected by a transverse bore 9 intended to receive a securing element 10.

The surfaces 11 and 12 of the yoke portion 2 which face the insertion gap 5 are roof-shaped. Because of the roof shape of these surfaces it is possible for the transverse bore 9 to be disposed in a very low position, referring to FIG. 1, and for that portion of the stepped bore 6 which receives the annular flange 8 to be given a length $L_1$ which amounts to a multiple of the length $L_2$ of the remainder of the stepped bore. The transverse bore 9 is nevertheless situated in a position which is not reached by the wear occurring during the normal life of the chain fitted with the connector. The obtaining of a large wearing volume for the yoke part 2 is also assisted by the fact that the side of the yoke part remote from the insertion gap 5 has a curved boundary surface 13.

Figure 2:
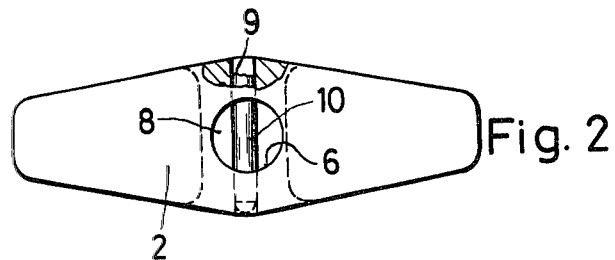
FIG. 2 is a plan view of the connector shown in FIG. 1.
Figure 3:
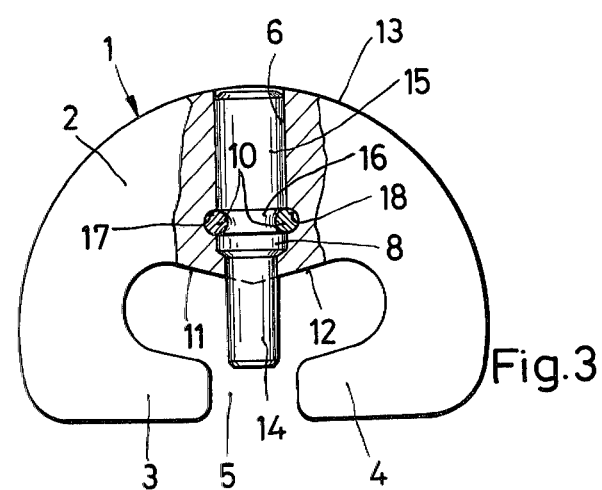
FIG. 3 shows, partly in section, a side view of a second connector.
Figure 4:
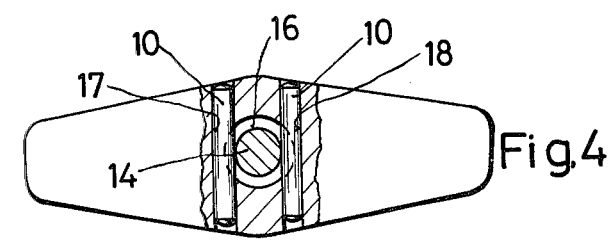
FIG. 4 shows, partly in section, a plan view of the connector shown in FIG. 3.

In the connector shown in FIGS. 3 and 4 the references used for corresponding parts are the same as those used for FIGS. 1 and 2. In contrast to the first embodiment, in this second embodiment a retaining pin 14 is used which has a deep-hardened head 15 which, together with the other parts of the retaining pin 14, substantially completely fills the stepped bore 6 when in the retaining position. The wearing volume of the connector 1 is further increased by the head 15. In addition, it is possible to use a head 15 having greater resistance to wear than the material of the yoke part 2.

In order to secure the retaining pin 14 in the retaining position, the pin 14 is provided with an annular groove 16 into which project two securing elements 10 inserted into transverse bores 17 and 18.

Figure 5:
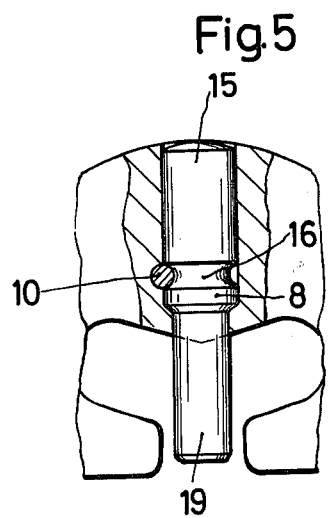
FIG. 5 shows the connector shown in FIG. 3, provided with only one securing element.

Whereas in the connector according to FIGS. 3 and 4 two securing elements 10 are used to secure the retaining pin 14, in the construction shown in FIG. 5 only one securing element is used to secure the retaining pin 19.

In all the constructions described the securing elements can be driven into the transverse bores with the aid of a hammer. Because of the position of the transverse bores, when the connector is used in conjunction with chains mounted on a tire, the blow is not transmitted to the resilient tire. Rebound forces, which would make the fitting of the securing elements difficult, thus do not occur. Since the securing elements are in all cases mounted at both ends and disposed in a protected position, their diameter can be considerably smaller than that of the retaining pin.

We claim:

1. A connector for chains, particularly tire chains, comprising a substantially C-shaped main body whose free arms define an insertion gap permitting the introduction of chain links and whose yoke portion is provided in a position lying opposite the insertion gap with a stepped bore for receiving a retaining pin which has an annular flange and which in its retaining position prevents accidental detachment of chain links, characterized in that the surfaces (11,12) of the yoke portion (2) which face the insertion gap (5) are roof-shaped, while the apex line of the roof surfaces is intersected by the axis of the stepped bore (6) and extends at right angles to the arms (3,4), and that for the purpose of locking the retaining pin (7, 14, 19) in the retaining position use is made of at least one securing element (10) which is seated in a transverse bore (9, 17, 18) intersecting the stepped bore (6) in a position which is not reached by wear occurring during the normal life of the chain fitted to the connector, said securing element (10) acting on that side of the annular flange (8) opposite to the retaining portion of the retaining pin (7, 14, 19).

2. A connector according to claim 1, characterized in that the length ($L_1$) of that part of the stepped bore (6) which receives the annular flange (8) is a multiple of the length ($L_2$) of the remainder of the stepped bore.

3. A connector according to claim 2, characterized in that when the retaining pin (7, 14, 19) is in the installed position its annular flange (8) lies in that third of the stepped bore (6) which is nearest the insertion gap (5).

4. A connector according to claim 1, characterized in that the retaining pin (14,19) has a deep-hardened head (15).

5. A connector according to claim 1, characterized in that the retaining pin (14,19) substantially completely fills the stepped bore (6) when in the retaining position.

6. A connector according to claim 1, characterized in that the yoke part (2) is in the form of a wearing part.

7. A connector according to claim 1, characterized in that the yoke part (2) of the main body (1) is provided on the side remote from the insertion gap (5) with a curved boundary surface (13).

* * * * *